United States Patent
Kawahara et al.

(10) Patent No.: US 7,830,126 B2
(45) Date of Patent: Nov. 9, 2010

(54) HYBRID VEHICLE CONTROL SYSTEM AND METHOD

(75) Inventors: Youhei Kawahara, Hitachi (JP); Akihiko Emori, Hitachi (JP); Manabu Jyou, Hitachi (JP); Yoshinori Aoshima, Tsukubamirai (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/783,058

(22) Filed: Apr. 5, 2007

(65) Prior Publication Data
US 2007/0247106 A1  Oct. 25, 2007

(30) Foreign Application Priority Data
Apr. 6, 2006  (JP) ............... 2006-105250

(51) Int. Cl.
*H02J 7/14* (2006.01)
*H02J 7/00* (2006.01)

(52) U.S. Cl. .................. 320/160; 320/104; 320/126; 903/907

(58) Field of Classification Search ............... 320/104, 320/117, 160; 324/426, 427, 434
See application file for complete search history.

(56) References Cited

U.S. PATENT DOCUMENTS

| 6,730,000 | B1* | 5/2004 | Leising et al. | 477/110 |
| 6,919,707 | B2* | 7/2005 | Kawai et al. | 320/117 |
| 2002/0069000 | A1* | 6/2002 | Nakao | 701/22 |
| 2003/0042866 | A1* | 3/2003 | Minamiura et al. | 320/104 |
| 2005/0212486 | A1* | 9/2005 | Nakada | 320/132 |
| 2006/0152195 | A1* | 7/2006 | Ishishita | 320/132 |

FOREIGN PATENT DOCUMENTS

| JP | 2004-6138 A | 1/2004 |
| JP | 2004-215459 A | 7/2004 |
| JP | 2005-3414 A | 1/2005 |
| JP | 2006-081910 | 3/2006 |

* cited by examiner

*Primary Examiner*—Edward Tso
*Assistant Examiner*—Johali A Torres Ruiz
(74) *Attorney, Agent, or Firm*—Crowell & Moring LLP

(57) ABSTRACT

When detecting an abnormality in some storage batteries, the hybrid vehicle control system separates the faulty storage batteries and leads the sound storage batteries to a high SOC.

25 Claims, 8 Drawing Sheets

EQUIVALENT IMPEDANCE TO SOC

EQUIVALENT IMPEDANCE TO TEMPERATURE

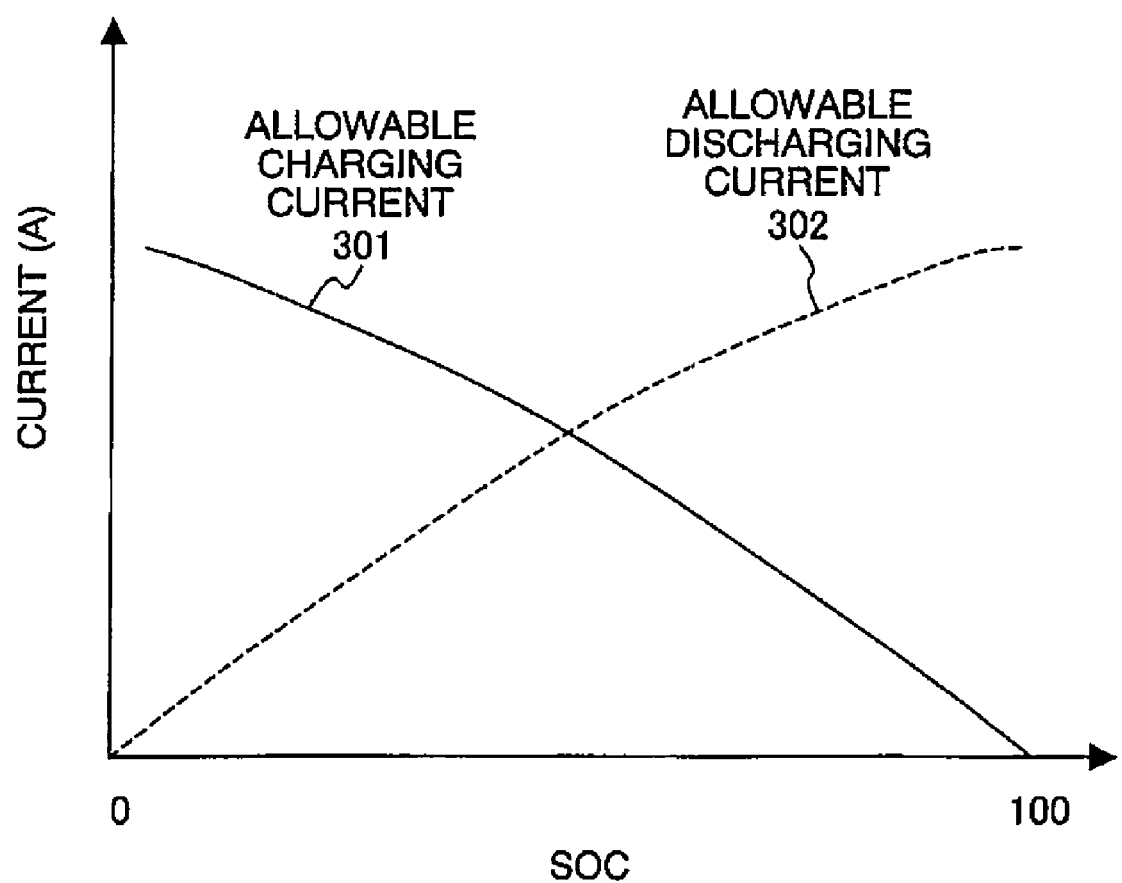

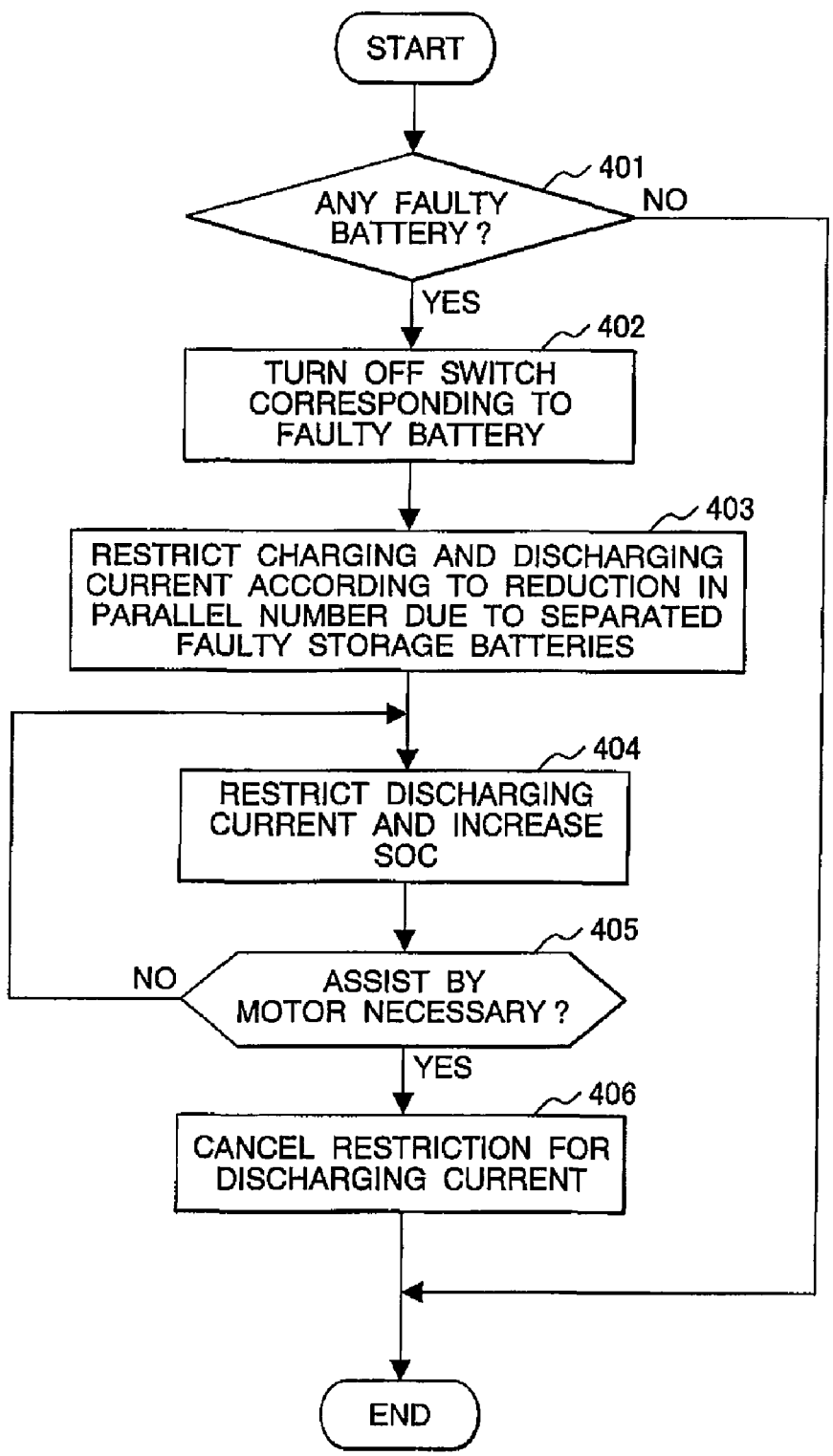

HYBRID VEHICLE CONTROL SYSTEM AND METHOD

CLAIM OF PRIORITY

The present application claims priority from Japanese application serial no. 2006-105250, filed on Apr. 6, 2006, the content of which is hereby incorporated by reference into this application.

FIELD OF THE INVENTION

The present invention relates to a hybrid vehicle control system using an electricity storing means such as a lead accumulator, a nickel-hydrogen cell, or a lithium ion cell.

BACKGROUND OF THE INVENTION

In a vehicle, a storage battery such as a lead accumulator, a nickel-hydrogen cell, or a lithium ion cell is loaded and power necessary for a hybrid automobile or an electric automobile such as power supply to an engine starting motor or electrical units is supplied from these storage batteries.

Storage batteries aiming at power supply during traveling which are loaded in a hybrid automobile are generally composed of multi-series and multi-parallel. The state of charge (SOC) and state of health (SOH) of these batteries, input/output allowable current and power, and abnormal state are detected in real time and the controller of the vehicle, according to the detected state of the storage batteries, uses the power of the storage batteries. When an abnormality occurs in the storage batteries, the vehicle is controlled so as to be stopped and there is a possibility that the function as an automobile may be deteriorated extremely. Therefore, a fail-safe function according to the abnormality of the batteries is necessary.

To solve such a problem, in Japanese Patent Laid-open No. 2004-6138, a fail-safe method for separating a faulty set battery unit by a switch among a plurality of set battery units connected in parallel and restricting the maximum output of a motor according to the number of sound set battery units is proposed.

SUMMARY OF THE INVENTION

However, in Japanese Patent Laid-open No. 2004-6138, when an abnormality occurs in the batteries, the motor output is restricted always, so that the performance of the hybrid vehicle is deteriorated extremely.

An object of the present invention is to provide a storage battery control system for a hybrid vehicle for suppressing a reduction in the performance even when an abnormality occurs in some storage batteries.

The present invention, in an aspect thereof, is characterized in that it changes to control for detecting and separating a storage battery in which an abnormality such as a fault occurs among a plurality of storage batteries connected in parallel and leading the remaining sound storage batteries to a high state of charge (SOC).

A preferred embodiment of the present invention is characterized in that in a storage battery control system for a hybrid vehicle for setting an allowable charge state range for a plurality of storage batteries connected in parallel, executing the charge and discharge control between the storage batteries and the electric loads in the vehicle within the allowable charge state range, and separating a storage battery in which an abnormality is detected, when separating the faulty storage battery, the preset allowable charge state range aforementioned is changed high.

More concretely, the upper limit and lower limit of the state of charge are set, and charging above the upper limit of the state of charge is prohibited, and discharging below the lower limit of the state of charge is prohibited, and when separating a faulty storage battery, the preset upper limit and/or lower limit of the state of charge is changed high.

Another preferred embodiment of the present invention is characterized in that in a storage battery control system for a hybrid vehicle for setting an allowable charge state range for a plurality of storage batteries connected in parallel, executing the charge and discharge control between the storage batteries and the electric loads in the vehicle within the allowable charge state range, executing the idle stop control (ISS) for stopping the engine when the vehicle is stopped for a predetermined period of time, and separating a storage battery in which an abnormality is detected, when separating the faulty storage battery, the idle stop control (ISS) is prohibited.

EFFECTS OF THE INVENTION

According to the preferred embodiments of the present invention, a storage battery control system for a hybrid vehicle capable of suppressing a lowering of the performance even when an abnormality occurs in some storage batteries can be provided.

BRIEF DESCRIPTION OF THE DRAWINGS

FIG. 3 is an illustration concerning the allowable current of the storage batteries relating to the present invention.

FIG. 4 is a flow chart for explaining the process contents of Embodiment 1 of the present invention.

DESCRIPTION OF THE PREFERRED EMBODIMENTS

Hereinafter, the preferred embodiments of the present invention will be explained in detail with reference to the accompanying drawings.

Embodiment 1

Figure 1:
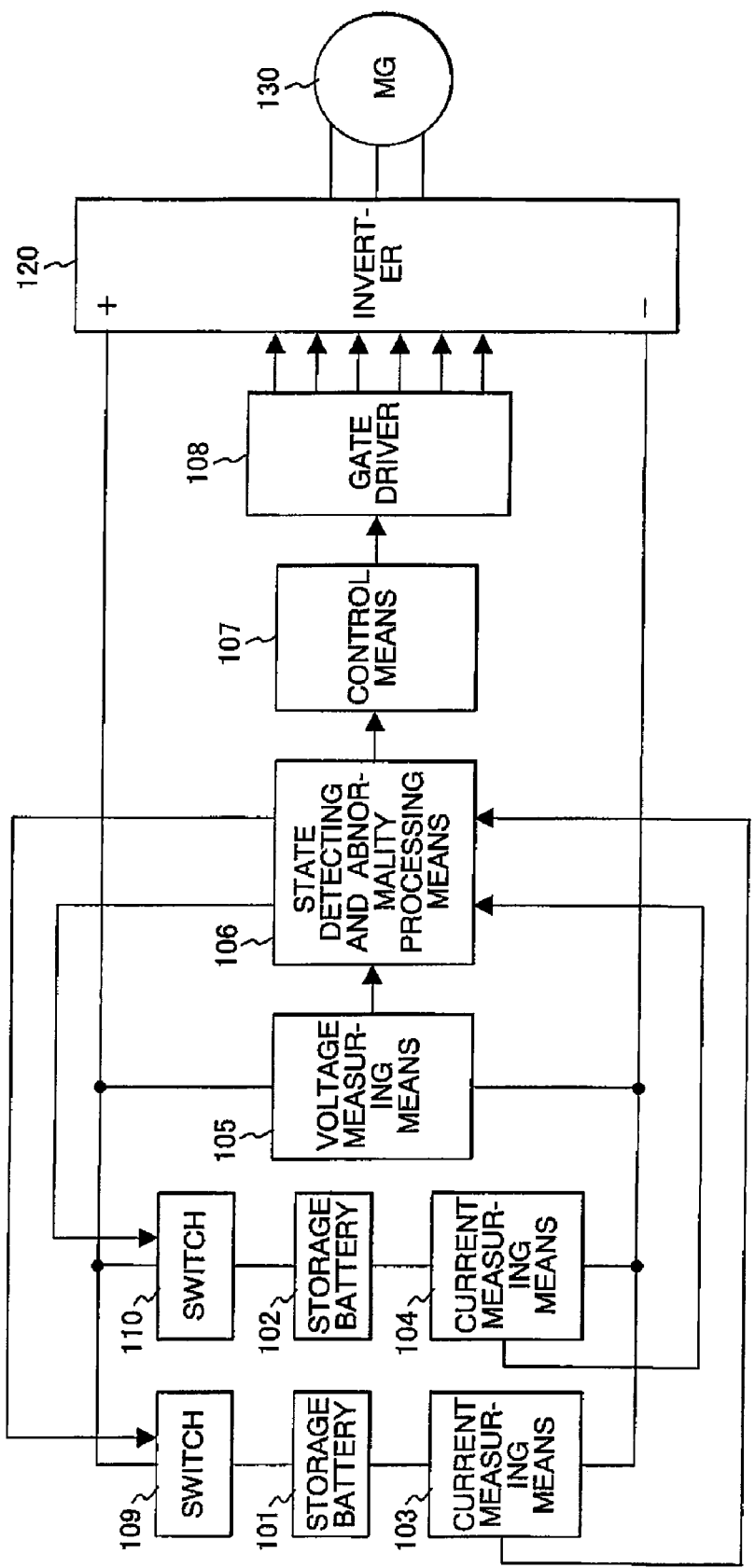
FIG. 1 is a whole block diagram of the storage battery control system for a hybrid vehicle of Embodiment 1 of the present invention.

FIG. 1 is a whole block diagram of the storage battery control system for a hybrid vehicle of Embodiment 1 of the present invention. Firstly, the system includes storage batteries 101 and 102 connected in parallel for storing and discharging electricity, current measuring means 103 and 104 for measuring currents at time of no-load of the storage batteries and during charging and discharging, and a voltage measuring means 105 for measuring voltages at both ends of the parallel connection circuit of the two storage batteries 101 and 102. To detect the state of the storage batteries 101 and 102 on the basis of measured results of the current measuring means 103 and 104 and voltage measuring means 105, a state detecting and abnormality processing means 106 is installed. On the basis of information from the state detecting and abnormality processing means 106, the system drives a gate driver 108 via a control means 107 and controls an inverter 120. The AC side of the inverter 120 is connected to a motor generator (MG) 130 and during traveling of a vehicle or at time of power generation, the system transfers AC power. The state detecting and abnormality processing means 106, when detecting a faulty battery on the basis of the aforementioned battery information, disconnects switches 109 and 110 and separates the faulty battery.

The storage batteries 101 and 102 may be any electricity storing device capable of storing and discharging electricity such as a lithium ion cell, a nickel-hydrogen cell, a lead accumulator, or an electric double layer capacitor.

As a state of the storage batteries 101 and 102 detected by the state detecting and abnormality processing means 106, the SOC (state of charge), SOH (state of health), an allowable current at which the storage batteries can be charged and discharged, and abnormal state may be cited. Further, the state detecting and abnormality processing means 106 may obtain also information of a temperature sensor installed inside or outside the storage batteries 101 and 102, thereby detect the state (not drawn). Further, it is desirable for the state detecting and abnormality processing means 106 to have a function for changing the use method for the storage batteries 101 and 102 on the basis of information from a vehicle. Further, it is desirable for the state detecting and abnormality processing means 106 to issue an instruction for changing the vehicle control method according to the state of the storage batteries. The state detecting and abnormality processing means 106 is composed of means for performing predetermined calculations or processes for input from the storage batteries 101 and 102 or vehicle and transmitting calculation or processing results or instruction contents to the outside. Generally, a computer composed of a storage unit, an arithmetic unit, an input unit, and an output unit and a controller are used. A concrete process of the state detecting and abnormality processing means 106 will be described later.

The inverter 120, on the basis of the information from the state detecting and abnormality processing means 106, uses the power of the storage batteries 101 and 102. For example, when the SOC of the storage batteries is high, the storage batteries can discharge sufficiently, thus the storage batteries are used free of charging. Further, at a low temperature, the allowable current of the storage batteries is small and at a high temperature, the allowable current is large, so that the input and output of the storage batteries are controlled according to temperature.

The MG 130 is used during traveling of a vehicle according to the output of the inverter 120 and when charging the storage batteries 101 and 102, operates as a generator. This embodiment uses a constitution having the MG 130, though it may be structured so as to separately install a generator represented by an alternator (not drawn).

The state detection method for the storage batteries executed by the state detecting and abnormality processing means 106 will be explained. The SOC, as shown by Formulas (1) and (2), can be obtained on the basis of the information from the storage batteries 101 and 102.

$$OCV = CCV - I \times R - Vp \quad (1)$$

$$SOC = MAP(OCV) \quad (2)$$

where OCV indicates electromotive force of the storage batteries 101 and 102, and CCV indicates an inter-terminal voltage of the storage batteries 101 and 102 obtained by the voltage measuring means 105, and I indicates a current measured at time of no-load or during charging and discharging. Further, R indicates an internal resistance of the storage batteries 101 and 102 which is obtained beforehand and is given to the state detecting and abnormality processing means 106 or is obtained in real time and Vp indicates a polarization voltage. OCV is obtained by Formula (1) and then from the relationship between OCV of the storage batteries 101 and 102 which is extracted beforehand and SOC, SOC can be obtained. Further, as another method for obtaining SOC, a means for integrating a current measured as indicated by Formula (3) may be cited.

$$SOC = SOC(t-1) + 100 \times \int I / Q\text{max} \quad (3)$$

In this embodiment, SOC may be obtained by Formulas (1) and (2) or as indicated in Formula (3), SOC may be obtained by integrating the current.

SOH is an index indicating the state of health of the storage batteries 101 and 102. When the storage batteries are deteriorated, the characteristics are changed such as a rise of the internal resistance or a reduction in the capacity at time of full charge. A method for obtaining SOH from the characteristics changed due to deterioration or from a comparison of the characteristics changed due to deterioration with the initial characteristics is general. The calculated SOH is reflected on other calculations and the state detection of the storage batteries 101 and 102 in consideration of the deterioration information can be executed. Further, SOH can be used as an index for deciding the life of the storage batteries 101 and 102.

The allowable current is a current which can be inputted or outputted at present by the storage batteries 101 and 102. Generally, in the storage batteries 101 and 102, an upper limit voltage Vmax and a lower limit voltage Vmin are decided according to the kind or performance thereof. The allowable current is a current not exceeding the upper limit voltage Vmax or lower limit voltage Vmin. The vehicle controls to charge or discharge the storage batteries 101 and 102 within the range of the allowable current. The allowable current is calculated respectively on the charging side and discharging side and the calculation method for the allowable charging current is indicated by Formula (4) and the calculation method for the allowable discharging current is indicated by Formula (5).

$$ICHG = (V\text{max} - OCV)/Rz \quad (4)$$

$$IDIS = (OCV - V\text{min})/Rz \quad (5)$$

where Rz indicates an equivalent impedance of the storage batteries 101 and 102.

Figure 2A:
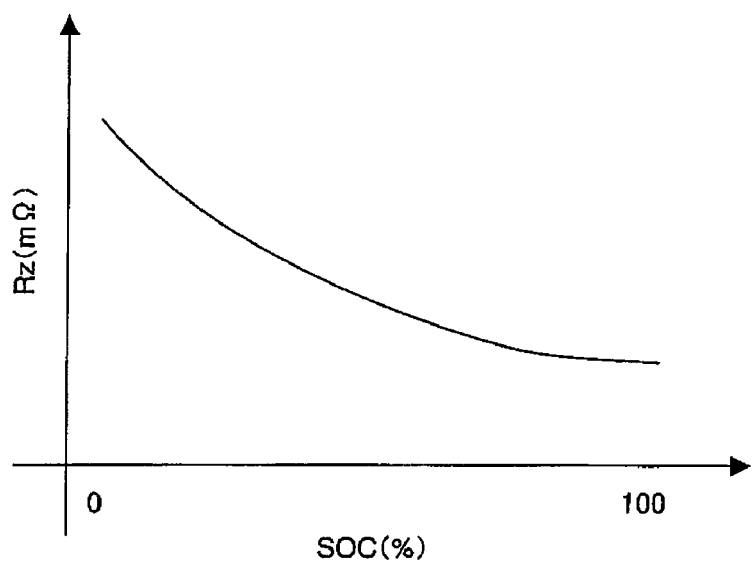
FIG. 2 is an illustration concerning the equivalent impedance of the storage batteries relating to the present invention.
Figure 2B:
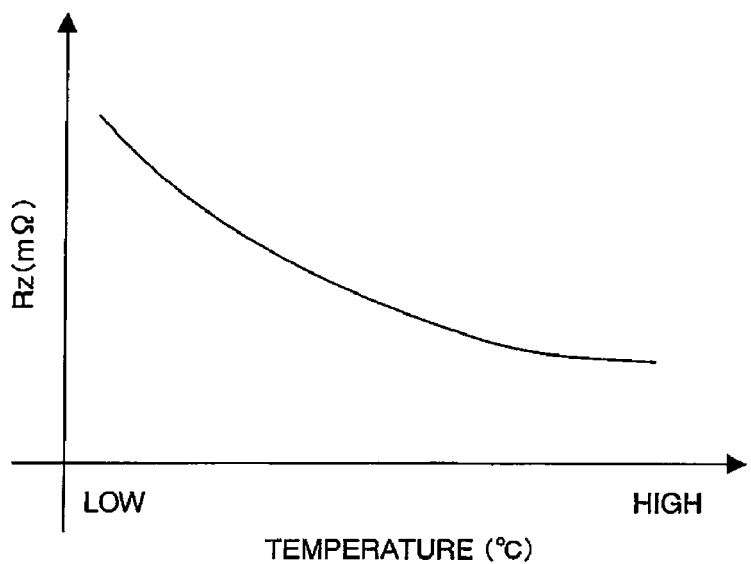

FIG. 2 is an illustration concerning the equivalent impedance of the storage batteries. As shown in the drawing, Rz varies with the temperature or SOC of the storage batteries 101 and 102. Therefore, when Rz according to the state of the storage batteries 101 and 102 is obtained beforehand and used or Rz is obtained in real time on the basis of the data obtained from the storage batteries 101 and 102, an accurate allowable current according to the state of the batteries can be obtained.

FIG. 3 is an illustration concerning the allowable current of the storage batteries. As shown in the drawing, an obtained allowable charging current 301 becomes smaller as the SOC becomes higher. Further, an obtained allowable discharging current 302 becomes larger as the SOC becomes higher. The host system performs charging and discharging control for charging the storage batteries 101 and 102 within the range of the received allowable charging current 301 and discharging the storage batteries 101 and 102 within the range of the allowable discharging current 302.

As a state detection process performed by the state detecting and abnormality processing means 106, in addition to the calculations of SOC, SOH, and allowable current, detection of the abnormal state of the storage batteries 101 and 102 may be cited. The abnormal state includes overcharge and overdischarge. Further, when the storage batteries 101 and 102 are structured so as to connect a plurality of storage batteries in series or parallel, temperature faults such as SOC imbalance between the storage batteries, temperature imbalance, and the temperature of the storage batteries 101 and 102 higher than a predetermined value as a whole may be cited. In detection of abnormal states of the storage batteries 101 and 102, a method for providing a threshold value for detecting each abnormal state and when either of the storage batteries 101 and 102 exceeds the threshold value, deciding the storage battery to be faulty is general.

FIG. 4 is a process flow chart for explaining the process contents of the state detecting and abnormality processing means 106 of Embodiment 1 of the present invention and explains the process to be performed when an abnormal state of the storage battery 101 or 102 is detected. The state detecting and abnormality processing means 106 monitors always the storage batteries 101 and 102 connected in parallel. And, the state detecting and abnormality processing means 106, when detecting at Step 401 a storage battery in which an abnormality such as a fault occurs, turns off at Step 402 the switch 109 or 110 corresponding to the storage battery 101 or 102 in the abnormal state and separates the faulty storage battery. When the two storage batteries 101 and 102 shown in FIG. 1 are connected in parallel, after either of the storage batteries 101 and 102 becomes faulty, there exists only one sound storage battery.

Next, the state detecting and abnormality processing means 106, at Step 403, restricts the allowable current which can be inputted and outputted at present by the batteries. The restriction method for the allowable current, for example, when the two storage batteries 101 and 102 are connected in parallel and one storage battery becomes faulty, halves the allowable current. Further, in an initial constitution of three storage batteries connected, when one storage battery becomes faulty, the restriction method restricts the allowable current to ⅔ and transmits it to the host system and furthermore when two storage batteries become faulty, the restriction method restricts the allowable current to ⅓ and transmits it to the host system. By such a process, according to the number of sound storage batteries, the host system can execute charge and discharge control for the storage batteries 101 and 102.

In this embodiment, for the allowable charging and discharging current of the storage batteries 101 and 102 either of which becomes faulty, the aforementioned control is executed and additionally, at Step 404, the allowable discharging current is restricted so as to be made smaller. Therefore, this embodiment is characterized in that even if the number of sound storage batteries is reduced, in order to respond to necessity of large power, the SOC is kept high.

The restriction method for the allowable discharging current in this case can be restricted optionally such as further restriction to ½ or ⅓ of the aforementioned allowable charging and discharging current decided according to the number of faulty storage batteries or the discharging current necessary at its minimum to realize the system may be decided as an allowable discharging current. As a result, the host system receives an allowable discharging current more smaller than the allowable charging current, so that the storage batteries 101 and 102 are subject to charge and discharge control so as to restrict discharge compared with charge. Therefore, the relationship between charge and discharge results in charge>discharge, so that the residual sound storage battery 101 or 102 can be led to a high SOC.

Meanwhile, the state detecting and abnormality processing means 106 obtains vehicle information, that is, information relating to vehicle traveling or fuel economy, for example, as represented by the current vehicle speed. The state detecting and abnormality processing means 106 obtains the aforementioned vehicle information relating to vehicle traveling or fuel economy and at Step 405, judges whether an engine assist by the motor 130 is necessary or not. Here, when the vehicle is stopped and at the next start time, necessity of assist is generated or when the state detecting and abnormality processing means 106 judges that the vehicle is traveling on an uphill slope, in other words, when it detects that the vehicle is in a poor fuel economy, it goes to Step 406 and cancels the restriction of the allowable discharging current which is forced strongly at Step 404. Namely, if the state detecting and abnormality processing means 106 detects the previous notice of start which is a representative example of a poor fuel economy by stopping of the vehicle, it cancels the restriction of the allowable discharging current.

By doing this, the discharge of the sound storage battery is restricted, so that an environment where the SOC can be enhanced easily is obtained and output of large power to the MG 130 from vehicle stop to start can be ensured. Sound storage batteries ensuring large surplus power of discharge are provided like this, thus even if either of the storage batteries 101 and 102 becomes faulty, a reduction in the traveling performance at the start time of the vehicle can be prevented.

According to this embodiment, even if either of the storage batteries becomes faulty, a hybrid vehicle control system capable of preventing a lowering of the traveling performance can be realized.

Embodiment 2

In Embodiment 2, the process contents of the state detecting and abnormality processing means 106 described in Embodiment 1 are changed. The other functions are the same as those of Embodiment 1.

Figure 5:
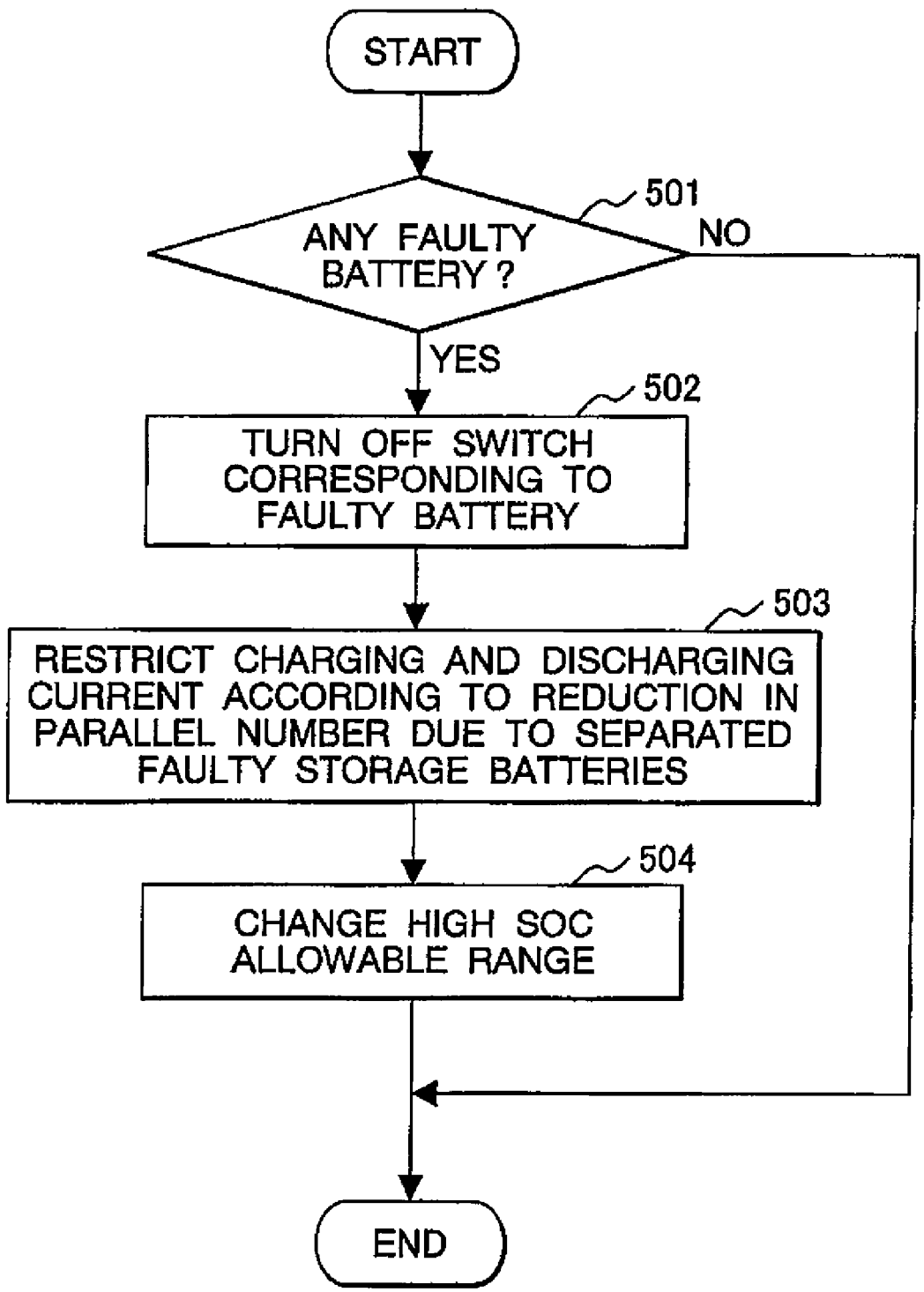
FIG. 5 is a flow chart for explaining the process contents of Embodiment 2 of the present invention.

FIG. 5 is a process flow chart for explaining the process contents of the state detecting and abnormality processing means 106 of Embodiment 2 of the present invention. The state detecting and abnormality processing means 106 executes state detection of the storage batteries 101 and 102, which are connected in parallel, in real time. The state detecting and abnormality processing means 106, when detecting at Step 501 a faulty storage battery among the storage batteries 101 and 102 connected in parallel, turns off at Step 502 the switch 109 or 110 corresponding to the faulty storage battery and separates the faulty storage battery. Next, at Step 503, similarly to Embodiment 1, the state detecting and abnormality processing means 106 executes an allowable current restriction according to the number of separated storage batteries. For example, when the two storage batteries are connected in parallel and one of them becomes faulty, the state detecting and abnormality processing means 106 restricts the allowable charging and discharging current to ½ and when three storage batteries are connected in parallel and one storage battery becomes faulty, the state detecting and abnormality processing means 106 restricts the allowable charging and discharging current to ⅔ and when two storage batteries become faulty, it restricts the allowable charging and discharging current to ⅓.

Generally, in a hybrid automobile, a charge and discharge realizable range centering on SOC 50%, for example, a range from 40% to 60% is decided and the storage batteries 101 and 102 are used. According to the performance of the storage batteries 101 and 102 and the system, the upper limit and lower limit of SOC are preset and within a range not exceeding the upper limit and not falling below the lower limit, the storage batteries 101 and 102 are used. In Embodiment 2, the state detecting and abnormality processing means 106 detects a faulty storage battery and restricts the charging and discharging current according to the number of sound storage batteries and at Step 504, it changes up the allowable range of SOC of the sound storage batteries. For example, under the conventional control, when using the storage batteries within the range from 40% to 60%, after detection of the faulty storage battery, the upper limit and lower limit are respectively increased by 10%, that is, are changed to 50% to 70% or are increased by 20%, that is, are changed to 60% to 80%. It is desirable to decide the control for raising the allowable range of SOC according to the performance of the storage batteries 101 and 102 and the vehicle system. Further, a method for changing only the upper limit of SOC is also acceptable. When the SOC is raised like the relationship between the SOC and the allowable current explained in FIG. 3, the allowable discharging current 302 can be made larger. Further, when only the upper limit of SOC is changed, the discharge realizable period of time can be made longer. Namely, the output of each residual sound storage battery can be kept high compared with that under the ordinary control.

Embodiment 3

Further, as Embodiment 3 of the present invention, Embodiments 1 and 2 can be combined. Namely, when a faulty storage battery occurs, (1) the charging and discharging current according to the number of faulty storage batteries is restricted, (2) the allowable SOC range is shifted high, (3) only the discharging current is restricted furthermore, and (4) when a motor assist is necessary, the restriction of the discharging current of Item (3) is canceled.

Figure 6:
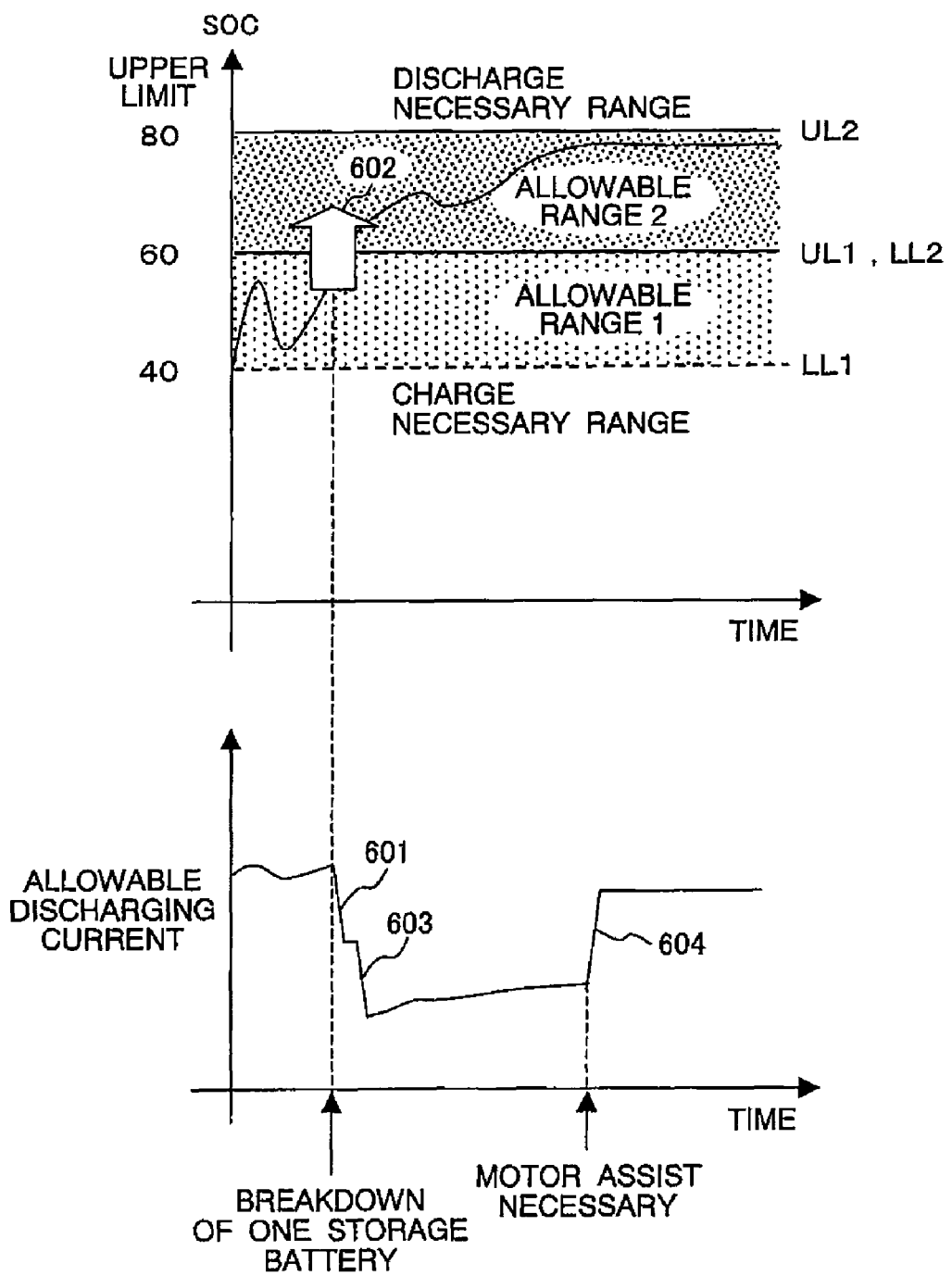
FIG. 6 is an illustration for the SOC and allowable discharging current of Embodiment 3 of the present invention.

FIG. 6 is an illustration for the SOC and allowable discharging current of Embodiment 3 of the present invention. Firstly, under normal condition, an allowable range 1 of SOC of the storage batteries is assumed as 40% to 60% from a lower limit LL1 to an upper limit UL1. Here, a fault (an abnormality) occurs in one storage battery, and the faulty storage battery is separated, and as specified at Step 403 shown in FIG. 4, a restriction 601 for the charging and discharging current according to the number of storage batteries is carried out. Further, as specified at Step 504 shown in FIG. 5, a change 602 to a high SOC of raising the allowable range 1 of SOC of the storage batteries to an allowable range 2 of SOC, that is, to 60% to 80% from a lower limit LL2 to an upper limit UL2 is carried out. On the other hand, as described at Step 404 shown in FIG. 4, a restriction 603 for the discharging current is carried out. By this change of control, the sound storage battery is led to a high SOC. The sound storage battery is kept within the range of high SOC, thus the allowable discharging current of each storage battery can be made larger than that under the normal control.

Therefore, for example, when a vehicle is stopped, for the nest start, a cancellation 604 for the restriction of the discharging current is carried out and in a poor fuel economy at start time, the motor 130 can be assisted fully.

According to Embodiment 3, when either of the storage batteries becomes faulty, a hybrid vehicle control system capable of improving a reduction in the output of the storage batteries which is necessary during traveling of the vehicle can be realized.

Embodiment 4

In Embodiment 4, in a hybrid vehicle, an idling stop system (ISS) is loaded.

The idling stop system is a system for automatically stopping the engine when the vehicle is stopped, thereby protecting the environment, and increasing fuel economy. However, when the vehicle is idling-stopped, during stop of the engine, it is necessary to supply power to the electrical units from the storage batteries 101 and 102. Furthermore, to restart the engine, it is necessary to consume the energy stored in the storage batteries, so that the vehicle enters an environment that the SOC of the storage batteries 101 and 102 is lowered easily.

Figure 7:
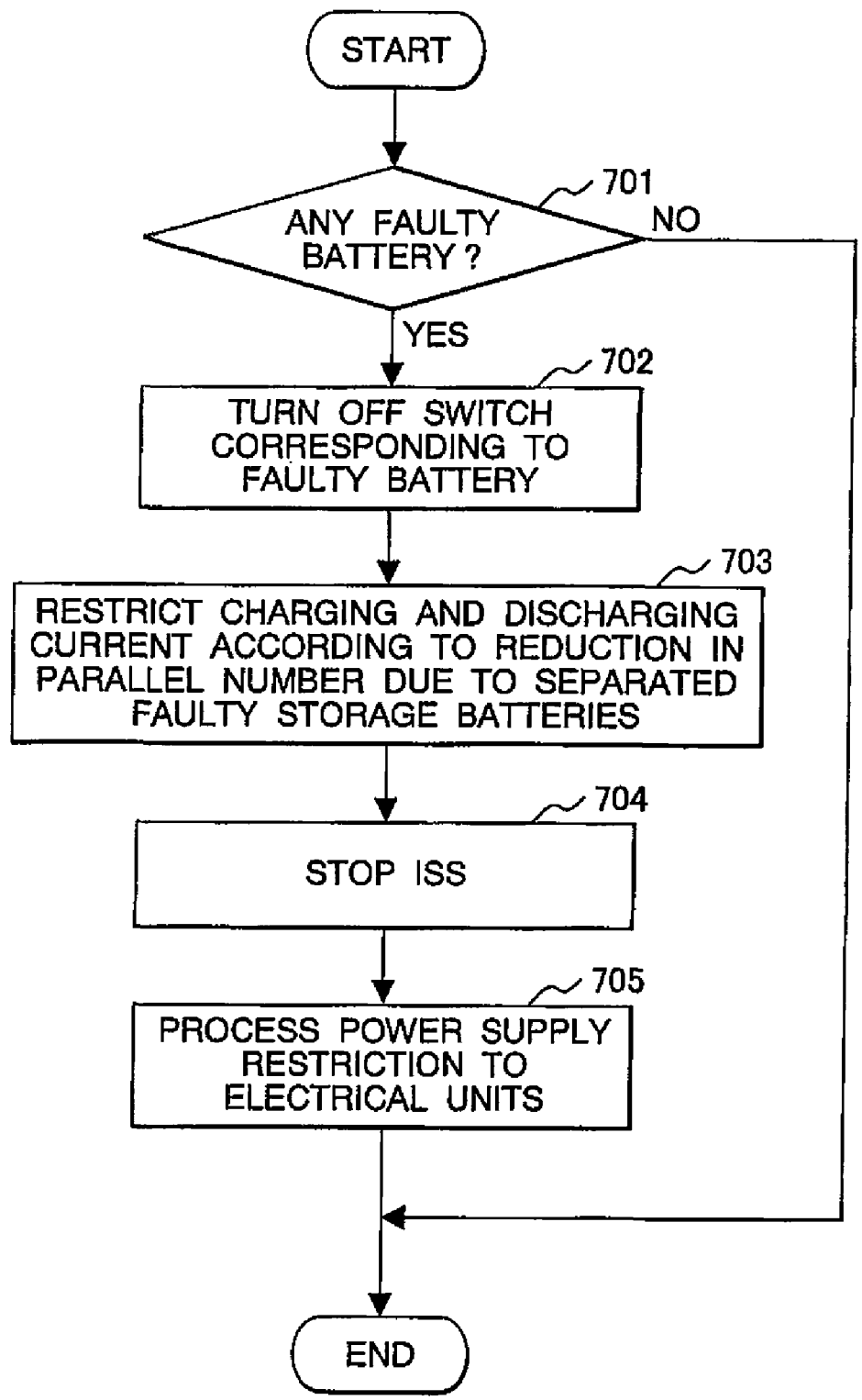
FIG. 7 is a flow chart for explaining the process contents of Embodiment 4 of the present invention.

FIG. 7 is a process flow chart of the state detecting and abnormality processing means 106 of Embodiment 4 of the present invention. By referring to the drawing, the operations of the state detecting and abnormality processing means 106 and idling stop system will be explained.

The state detecting and abnormality processing means 106 detects a faulty storage battery at Step 701, separates the faulty storage battery at Step 702, and restricts at Step 703 the allowable current according to the number of sound storage batteries. Then, at Step 704, the state detecting and abnormality processing means 106 transmits an idling stop prohibition signal to the controller for controlling the idling stop system loaded in the vehicle. The transmission method may be wired communication or wireless communication if it is an information transmitting means such as serial, CAN (control area network), infrared communication, or LAN (local area network). Furthermore, at Step 705, the electrical units unnecessary for traveling itself of the vehicle such as an air conditioner, a car radio, a car stereo, a car navigator, and a car TV set are stopped automatically, thus power supply to the electrical units using the storage batteries 101 and 102 is restricted.

In Embodiment 4, the power supply at the restart time of the engine after idling stop is eliminated, and the power supply to the electrical units using the storage batteries after engine stop is reduced, thus the control for the vehicle is changed so as not to lower the SOC of the storage batteries. In addition to the stop of the idling stop system, the unnecessary electrical units for traveling itself of the vehicle including the air conditioner and others indicated above are stopped automatically, thus the storage batteries can be kept at a more higher SOC. By doing this, the storage batteries can devote themselves to the power supply to the vehicle traveling assist.

According to Embodiment 4, when either of the storage batteries becomes faulty, a hybrid vehicle control system capable of making the storage batteries devote themselves to the power supply to the vehicle traveling assist can be realized.

Embodiment 5

Figure 8:
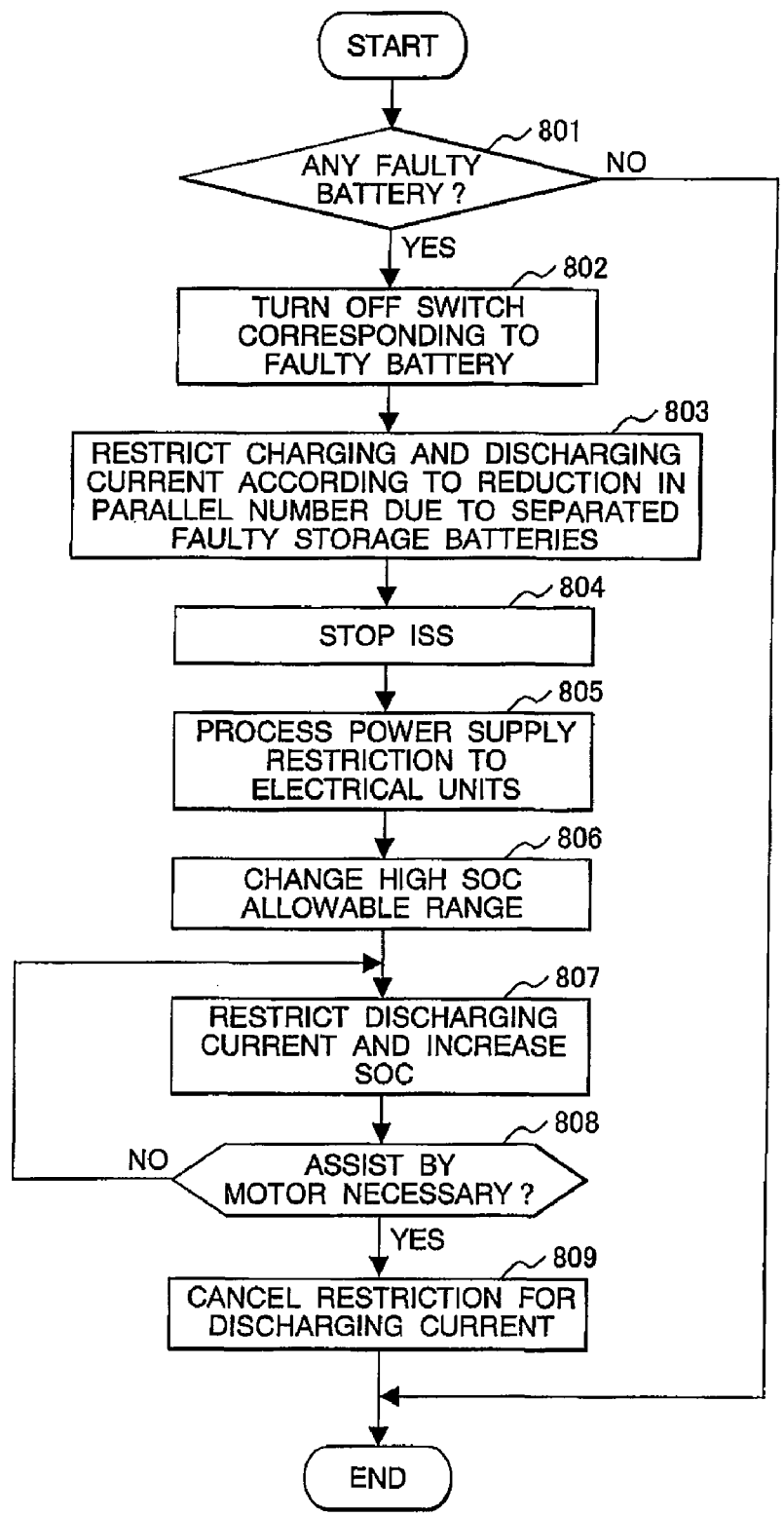
FIG. 8 is a flow chart for explaining the process contents of Embodiment 5 of the present invention.

FIG. 8 is a flow chart for explaining the process contents of the state detecting and abnormality processing means 106 of the storage battery control system of a hybrid vehicle of Embodiment 5 of the present invention.

Embodiment 5, basically, can be considered to have all the processes of the previous embodiments. Firstly, the processes at Steps 801 to 805 are the same as those at Steps 701 to 705 shown in FIG. 7. Next, the process at Step 806 corresponds to the process at Step 504 shown in FIG. 5 and the process at Step 807 corresponds to the process at Step 404 shown in FIG. 4. Furthermore, the processes at Steps 808 and 809 are the same as the processes at Steps 405 and 406 shown in FIG. 4.

According to Embodiment 5, a hybrid vehicle control system for displaying all the operation effects of Embodiments 1 to 4 described above can be realized.

Further, at Step 808, a judgment of whether rising of the SOC is detected by the state detecting and abnormality processing means 106 or not can be added. In this case, in addition to the previous effects of the embodiments, the surplus power of the storage batteries can be used effectively.

INDUSTRIAL APPLICABILITY

The present invention is intended to apply to a power source system having a set battery composed of a plurality of storage batteries combined in parallel and can be used widely to vehicles such as a hybrid automobile and an electric automobile.

What is claimed is:

1. A hybrid vehicle control system characterized in that in a storage battery control system for a hybrid vehicle comprises a plurality of storage batteries connected in parallel for supplying power to electric loads including a drive motor in said hybrid vehicle, allowable charge state range setting means for setting an allowable charge state range for said storage batteries, charge and discharge control means for controlling charge and discharge between said storage batteries and said electric loads in said vehicle within said allowable charge state range, storage battery abnormality detecting means for detecting an abnormality in said storage batteries, a plurality of switching means for connecting or separating said plurality of storage batteries respectively from said electric loads in said vehicle, and faulty storage battery separating means for, when said storage battery abnormality detecting means detects an abnormality in any of said storage batteries connected in parallel, for separating said switching means corresponding to said faulty storage battery, wherein allowable charge state range changing means changes high said allowable charge state range of said storage batteries preset in said allowable charge state range setting means so that the charge and discharge of remaining storage batteries is controlled within an allowable charge state range which is higher than said allowable charge state range of said storage batteries preset in said allowable charge state range setting means when separating said faulty storage battery is installed.

2. The hybrid vehicle control system according to claim 1, wherein said allowable charge state range setting means has means for setting an upper limit and a lower limit of said state of charge and said charge and discharge control means has charge prohibition means for prohibiting charging above said upper limit of said state of charge and discharge prohibition means for prohibiting discharging below said lower limit of said state of charge, and said allowable charge state range changing means has means for changing high said preset upper limit and/or said preset lower limit of said state of charge when separating a faulty storage battery.

3. The hybrid vehicle control system according to claim 1, wherein said charge and discharge control means has discharging current restricting means for restricting said discharging current when separating said faulty storage battery.

4. The hybrid vehicle control system according to claim 3, wherein said allowable charge state range setting means has means for setting an upper limit and a lower limit of said state of charge and said charge and discharge control means has charge prohibition means for prohibiting charging above said upper limit of said state of charge and discharge prohibition means for prohibiting discharging below said lower limit of said state of charge, and said allowable charge state range changing means has means for changing high said preset upper limit and/or said lower limit of said state of charge when separating a faulty storage battery.

5. The hybrid vehicle control system according to claim 3, wherein said charge and discharge control means has discharging current restriction canceling means for canceling said restriction for said discharging current when predicting or judging necessity of assisting an engine by a motor.

6. The hybrid vehicle control system according to claim 3, wherein said charge and discharge control means has discharging current restriction canceling means for canceling said restriction for said discharging current when predicting or detecting a high load state including start of said hybrid vehicle.

7. The hybrid vehicle control system according to claim 6, wherein said charge and discharge control means has means for predicting said high load state according to stop of said vehicle.

8. The hybrid vehicle control system according to claim 1 further comprising engine stop means for stopping an engine when said vehicle stops for a predetermined period of time and an ISS prohibiting means for prohibiting an operation of said engine stop means when separating said faulty storage battery.

9. The hybrid vehicle control system according to claim 1 further comprising means for prohibiting power supply to a predetermined electrical unit in said vehicle from said sound storage batteries when separating said faulty storage battery.

10. The hybrid vehicle control system according to claim 8 further comprising means for prohibiting power supply to a predetermined electrical unit in said vehicle from said sound storage batteries when separating said faulty storage battery.

11. The hybrid vehicle control system according to claim 1, wherein said allowable charge state range setting means has means for setting an upper limit and a lower limit of said state of charge, and said allowable charge state range changing means has means for changing high said preset upper limit and/or said preset lower limit of said state of charge when separating a faulty storage battery, and said charge and discharge control means has charge prohibition means for prohibiting charging above said upper limit of said state of charge, discharge prohibition means for prohibiting discharging below said lower limit of said state of charge, discharging current restricting means for restricting said discharging current when separating said faulty storage battery, and discharging current restriction canceling means for canceling said restriction for said discharging current when predicting or judging necessity of assisting an engine by a motor.

12. A hybrid vehicle control system comprising a storage battery control system for a hybrid vehicle having a plurality of storage batteries connected in parallel for supplying power to electric loads including a drive motor in said hybrid vehicle, allowable charge state range setting means for setting an allowable charge state range for said storage batteries, charge and discharge control means for controlling charge and discharge between said storage batteries and said electric loads in said vehicle within said allowable charge state range, engine stop means for stopping an engine when said vehicle stops for a predetermined period of time, storage battery abnormality detecting means for detecting an abnormality in said storage batteries, a plurality of switching means for connecting or separating said plurality of storage batteries respectively from said electric loads in said vehicle, faulty storage battery separating means for, when said storage battery abnormality detecting means detects an abnormality in any of said storage batteries connected in parallel, separating said switching means corresponding to said faulty storage battery, an ISS prohibiting means for prohibiting an operation of said engine stop means when separating said faulty storage battery is provided, and allowable charge state range changing means for changing high said allowable charge state range of said storage batteries set by said allowable charge state range setting means so that the charge and discharge of remaining storage batteries is controlled within an allowable charge state range which is higher than said allowable charge state range of said storage batteries preset in said allowable charge state range setting means when separating said faulty storage battery.

13. The hybrid vehicle control system according to claim 12, wherein said charge and discharge control means has discharging current restricting means for restricting said discharging current when separating said faulty storage battery.

14. The hybrid vehicle control system according to claim 13, wherein said charge and discharge control means has discharging current restriction canceling means for canceling said restriction for said discharging current when predicting or judging necessity of assisting an engine by a motor.

15. The hybrid vehicle control system according to claim 12 further comprising means for prohibiting power supply to a predetermined electrical unit in said vehicle from said sound storage batteries when separating said faulty storage battery.

16. A hybrid vehicle control method comprising a step of setting an allowable charge state range for a plurality of storage batteries connected in parallel for supplying power to electric loads including a drive motor in said hybrid vehicle, a step of controlling charge and discharge between said storage batteries and said electric loads in said vehicle within said allowable charge state range, a step of detecting an abnormality in said storage batteries, a step, when detecting an abnormality in any of said storage batteries connected in parallel, of separating said faulty storage battery from said electric loads, and a step, when separating said faulty storage battery, of changing high said preset allowable charge state range of said storage batteries so that the charge and discharge of remaining storage batteries is controlled within an allowable charge state range, which is higher than said allowable charge state range of said storage batteries that has been set.

17. The hybrid vehicle control method according to claim 16 further comprising a step of setting an upper limit and a lower limit of said state of charge, a step of prohibiting charging above said upper limit of said state of charge, a step of prohibiting discharging below said lower limit of said state of charge, and a step, when separating said faulty storage battery, of changing high said preset upper limit and/or said preset lower limit of said state of charge.

18. The hybrid vehicle control method according to claim 16 further comprising a step, when separating said faulty storage battery, of restricting said discharging current and a step, when predicting or detecting a high load state including start of a drive motor in said hybrid vehicle, of canceling said restriction for said discharging current.

19. The hybrid vehicle control method according to claim 16 further comprising an ISS step of stopping an engine when said vehicle stops for a predetermined period of time and an ISS prohibition step of prohibiting an operation of said ISS step when separating said faulty storage battery.

20. A vehicle storage battery control system comprising:
a plurality of storage batteries connected in parallel for supplying power to electric loads including a drive motor in said vehicle,
allowable charge state range setting means for setting an allowable charge state range for said storage batteries and transmitting said allowable charge state range to charge and discharge control means for controlling charge and discharge between said storage batteries and said electric loads in said vehicle within said allowable charge state range,
storage battery abnormality detecting means for detecting an abnormality in said storage batteries,
a plurality of switching means for connecting or separating said plurality of storage batteries connected in parallel respectively from said electric loads in said vehicle,
faulty storage battery separating means, when said storage battery abnormality detecting means detects an abnormality in any of said storage batteries connected in parallel, for separating said switching means corresponding to said faulty storage battery, and
allowable charge state range changing means, when separating said faulty storage battery, for changing high said allowable charge state range of said storage batteries preset in said allowable charge state range setting means so that charge and discharge of remaining storage batteries are controlled within an allowable charge state range which is higher than said allowable charge state range of said storage batteries set by said allowable charge state range setting means.

21. The vehicle storage battery control system according to claim 20, wherein said allowable charge state range setting means includes means for setting an upper limit and a lower limit of said state of charge and means, when separating said faulty storage battery, for changing high said preset limit and/or said preset lower limit of said state of charge.

22. The vehicle storage battery control system according to claim 20, wherein said allowable charge state range changing means has discharging current restriction means for canceling restriction for a discharging current by said charge and discharge control means when predicting or detecting a high load state including start of said vehicle.

23. A vehicle storage battery control system comprising:
a plurality of storage batteries connected in parallel for supplying power to electric loads including a drive motor in said vehicle,
allowable charge state range setting means for setting an allowable charge state range for said storage batteries and transmitting said allowable charge state range to charge and discharge control means for controlling charge and discharge between said storage batteries and said electric loads in said vehicle within said allowable charge state range,
storage battery abnormality detecting means for detecting an abnormality in said storage batteries,
a plurality of switching means for connecting or separating said plurality of storage batteries connected in parallel respectively from said electric loads in said vehicle,
faulty storage battery separating means, when said storage battery abnormality detecting means detects an abnormality in any of said storage batteries connected in parallel, for separating said switching means corresponding to said faulty storage battery,
ISS prohibiting means, when separating said faulty storage battery, to engine stop means for stopping an engine when said vehicle stops for a predetermined period of time, for transmitting a prohibition signal for prohibiting stop of said engine, and allowable charge state range changing means for, when separating said faulty storage battery, changing high said allowable charge state range of said storage batteries preset in said allowable charge state range setting means so that the charge and discharge of remaining storage batteries is controlled within an allowable charge state range that is higher than said allowable charge state range of said storage batteries set by said allowable charge state range setting means.

24. A hybrid vehicle control system with a storage battery control system for a hybrid vehicle, comprising:

a plurality of storage batteries connected in parallel for supplying power to electrical loads, including a drive motor, in said hybrid vehicle, allowable charge state range setting means for setting an upper limit and a lower limit of an allowable charge state range for said storage batteries, charge and discharge control means for controlling charge and discharge between said storage batteries and said electric loads in said vehicle within the upper limit and the lower limit of the allowable charge state range, storage battery abnormality detecting means for detecting an abnormality in said storage batteries, a plurality of switching means for respectively connecting said plurality of storage batteries to or separating said plurality of storage batteries from said electric loads in said vehicle, faulty storage battery separating means for separating said switching means corresponding to a faulty storage battery when said storage battery abnormality detecting means detects an abnormality in any of said storage batteries connected in parallel, and allowable charge state range changing means for increasing at least one of the upper limit and the lower limit of the allowable charge state range of said storage batteries, which is preset in said allowable charge state range setting means, so that the charge and discharge of remaining storage batteries is controlled within the allowable charge state range, which is higher than said allowable charge state range set by said allowable charge state range setting means, when said faulty storage battery is installed and said switching means corresponding to said faulty storage battery is separated.

25. A hybrid vehicle control system having a storage battery control system for a hybrid vehicle comprising:

a plurality of storage batteries including at least first and second storage batteries that are connected in parallel for supplying power to electric loads including a drive motor in said hybrid vehicle, at least one current measuring device to measure respective currents of the first and second storage batteries and outputting current information, a voltage measuring device to measure voltage across the first and second storage batteries and outputting voltage information, a plurality of switches for connecting or separating said first and second storage batteries respectively from said electric loads in said vehicle, a battery state detector and abnormality processor for receiving the current and voltage information and detecting when one of said first and second storage batteries is in an abnormal state based on the current and voltage information and, when the abnormal state is present, disconnecting one of said switches to separate said one of the first and second storage batteries in the abnormal state, and raising upper and lower battery state of charge limits to increase an allowable battery state of charge range so that the charge and discharge of remaining storage batteries is controlled within the allowable charge state range, which is higher than said allowable charge state range set by said allowable charge state range setting means, and a control means for receiving detector and processor information from the battery state detector and abnormality processor, and controlling a gate driver that, in turn, controls an inverter connected to a motor generator based on the detector and processor information received.

* * * * *